United States Patent [19]

Armstrong et al.

[11] 3,780,277

[45] Dec. 18, 1973

[54] APPARATUS FOR PROPAGATING INTERNAL LOGIC GATE FAULTS IN A DIGITAL LOGIC SIMULATOR

[75] Inventors: Douglas Byron Armstrong, Two North Twp., Boulder Cty., Colo.; Richard Glenn South, Boonton, N.J.

[73] Assignee: Bell Telephone Laboratories Incorporated, Murray Hill, N.J.

[22] Filed: July 13, 1972

[21] Appl. No.: 271,501

[52] U.S. Cl. ................................ 235/153 AC, 444/1

[51] Int. Cl. .......................... H03k 5/18, G06f 15/20

[58] Field of Search ................. 235/153 A, 153 AC, 235/153 AK; 444/1

[56] References Cited

UNITED STATES PATENTS 3,702,011 10/1972 Armstrong ............................. 444/1

FOREIGN PATENTS OR APPLICATIONS 229,042 10/1968 U.S.S.R. ....................... 235/153 AC

*Primary Examiner*—Eugene G. Botz
*Assistant Examiner*—R. Stephen Dildine, Jr.
*Attorney*—W. L. Keefauver et al.

[57] ABSTRACT

An improved apparatus and method for propagating faults in a digital logic fault simulator. The method is a more accurate way of propagating internal faults through logic gates and flip-flops that are on loops, that is, gates and flip-flops having at least one input that can be traced back to their outputs. Internal faults are propagated through a loop gate by using the faulty input bit patterns to the gate to access a list of all possible internal faults of the gate in order to determine which internal faults should be propagated through it. Internal faults are propagated through loop flip-flops by accessing an equation table to determine the correct relationship of the current output fault lists to the previous output fault lists, the current input fault lists, and the internal faults of the flip-flops.

3 Claims, 13 Drawing Figures

FIG. 1A
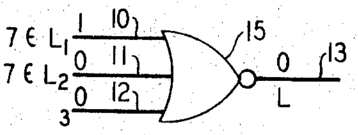
FIG. 2
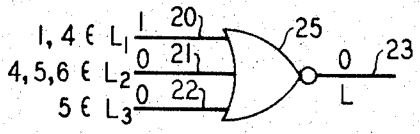
FIG. 1B
| INPUT LOGIC VALUE | | | ERROR FREE OUTPUT LOGIC VALUE | INTERNAL FAULTS & LOGICAL EFFECTS | | | | | | | | DETECTED INTERNAL FAULTS |
|---|---|---|---|---|---|---|---|---|---|---|---|---|
| | | | | 1 | 2 | 3 | 4 | 5 | 6 | 7 | 8 | |
| 0 | 0 | 0 | 1 | 0 | 1 | 1 | 1 | 1 | 1 | 0 | 0 | 1, 7, 8 |
| 0 | 0 | 1 | 0 | 0 | 1 | 1 | 0 | 0 | 0 | 0 | 0 | 2, 3 |
| 0 | 1 | 0 | 0 | 0 | 1 | 0 | 1 | 0 | 1 | 1 | 0 | 2, 4, 6, 7 |
| 0 | 1 | 1 | 0 | 0 | 1 | 0 | 0 | 0 | 0 | 0 | 0 | 2 |
| 1 | 0 | 0 | 0 | 0 | 1 | 0 | 0 | 1 | 1 | 0 | 1 | 2, 5, 6, 8 |
| 1 | 0 | 1 | 0 | 0 | 1 | 0 | 0 | 0 | 0 | 0 | 0 | 2 |
| 1 | 1 | 0 | 0 | 0 | 1 | 0 | 0 | 0 | 1 | 0 | 0 | 2, 6 |
| 1 | 1 | 1 | 0 | 0 | 1 | 0 | 0 | 0 | 0 | 0 | 0 | 2 |
FIG. 8C
| FAULT NUMBERS | FAULTY BIT PATTERNS | | |
|---|---|---|---|
| 1 | 0 | 0 | 0 |
| 4 | 0 | 1 | 0 |
| 5 | 1 | 1 | 1 |
| 6 | 1 | 1 | 0 |

FIG. 6A

| OLD OUTPUTS P | OLD OUTPUTS Q | NEW INPUTS R | NEW INPUTS S | NEW OUTPUTS P | NEW OUTPUTS Q | EQUATION FOR $P_2$ | EQUATION FOR $Q_2$ |
|---|---|---|---|---|---|---|---|
| 1 | 0 | 0 | 0 | 1 | 0 | $R\bar{p}_H + Q_1\bar{S} + \bar{S}p_X + q_H + p_L$ | $R\bar{S}\bar{p}_H\bar{q}_L + Q_1\bar{S} + \bar{S}(p_H + p_L) + q_H$ |
| 0 | 1 | 0 | 0 | 0 | 1 | $\bar{R}S\bar{p}_L\bar{q}_H + P_1\bar{R} + \bar{R}(q_L + q_H) + p_H$ | $S\bar{q}_H + P_1\bar{R} + \bar{R}q_X + p_H + q_L$ |
| 0 | 0 | 0 | 0 | X | X | $\Phi$ | $\Phi$ |
| 1 | 1 | 0 | 0 | X | X | $\Phi$ | $\Phi$ |
| 1 | X | 0 | 0 | X | X | $\Phi$ | $\Phi$ |
| X | 1 | 0 | 0 | X | X | $\Phi$ | $\Phi$ |
| 0 | X | 0 | 0 | X | X | $\Phi$ | $\Phi$ |
| X | 0 | 0 | 0 | X | X | $\Phi$ | $\Phi$ |
| X | X | 0 | 0 | X | X | $\Phi$ | $\Phi$ |
| 1 | 0 | 0 | 1 | 1 | 0 | $R\bar{p}_H + SQ_1 + Sp_X + q_H + p_L$ | $RS\bar{p}_H\bar{q}_L + SQ_1 + S(p_L + p_X) + q_H$ |
| 0 | 1 | 0 | 1 | 1 | 0 | $R\bar{p}_H + S\bar{Q}_1 + Sp_X + q_H + p_L$ | $RS\bar{p}_H\bar{q}_L + S\bar{Q}_1 + S(p_L + p_X) + q_H$ |
| 0 | 0 | 0 | 1 | 1 | 0 | $R\bar{p}_H + SQ_1 + Sp_X + q_H + p_L$ | $RS\bar{p}_H\bar{q}_L + SQ_1 + S(p_L + p_X) + q_H$ |
| 1 | 1 | 0 | 1 | X | X | $\Phi$ | $\Phi$ |
| 1 | X | 0 | 1 | X | X | $\Phi$ | $\Phi$ |
| X | 1 | 0 | 1 | X | X | $\Phi$ | $\Phi$ |
| 0 | X | 0 | 1 | 1 | 0 | $R\bar{p}_H + Sp_X + q_H + p_L$ | $RS\bar{p}_H\bar{q}_L + S(p_L + p_X) + q_H$ |
| X | 0 | 0 | 1 | 1 | 0 | $R\bar{p}_H + SQ_1 + Sp_X + q_H + p_L$ | $RS\bar{p}_H\bar{q}_L + SQ_1 + S(p_L + p_X) + q_H$ |
| X | X | 0 | 1 | 1 | 0 | $R\bar{p}_H + Sp_X + q_H + p_L$ | $RS\bar{p}_H\bar{q}_L + S(p_L + p_X) + q_H$ |
| 1 | 0 | 1 | 0 | 0 | 1 | $RS\bar{p}_L\bar{q}_H + R\bar{P}_1 + R(q_L + q_X) + p_H$ | $S\bar{q}_H + R\bar{P}_1 + Rq_X + p_H + q_L$ |
| 0 | 1 | 1 | 0 | 0 | 1 | $RS\bar{p}_L\bar{q}_H + RP_1 + R(q_L + q_X) + p_H$ | $S\bar{q}_H + RP_1 + Rq_X + p_H + q_L$ |
| 0 | 0 | 1 | 0 | 0 | 1 | $RS\bar{p}_L\bar{q}_H + RP_1 + R(q_L + q_X) + p_H$ | $S\bar{q}_H + RP_1 + Rq_X + p_H + q_L$ |
| 1 | 1 | 1 | 0 | X | X | $\Phi$ | $\Phi$ |
| 1 | X | 1 | 0 | X | X | $\Phi$ | $\Phi$ |
| X | 1 | 1 | 0 | X | X | $\Phi$ | $\Phi$ |
| 0 | X | 1 | 0 | 0 | 1 | $RS\bar{p}_L\bar{q}_H + RP_1 + R(q_L + q_X) + p_H$ | $S\bar{q}_H + RP_1 + Rq_X + p_H + q_L$ |
| X | 0 | 1 | 0 | 0 | 1 | $RS\bar{p}_L\bar{q}_H + R(q_L + q_X) + p_H$ | $S\bar{q}_H + Rq_X + p_H + q_L$ |
| X | X | 1 | 0 | 0 | 1 | $RS\bar{p}_L\bar{q}_H + R(q_L + q_X) + p_H$ | $S\bar{q}_H + Rq_X + p_H + q_L$ |
| 1 | 0 | 1 | 1 | 0 | 0 | $R\bar{S}\bar{p}_L\bar{q}_H + R\bar{P}_1\bar{p}_X + R(q_L + q_X) + p_H$ | $\bar{R}S\bar{p}_H\bar{q}_L + SQ_1\bar{q}_X + S(p_L + p_X) + q_H$ |
| 0 | 1 | 1 | 1 | 0 | 0 | $R\bar{S}\bar{p}_L\bar{q}_H + RP_1\bar{p}_X + R(q_L + q_X) + p_H$ | $\bar{R}S\bar{p}_H\bar{q}_L + S\bar{Q}_1\bar{q}_X + S(p_L + p_X) + q_H$ |
| 0 | 0 | 1 | 1 | 0 | 0 | $R\bar{S}\bar{p}_L\bar{q}_H + RP_1\bar{p}_X + R(q_L + q_X) + p_H$ | $\bar{R}S\bar{p}_H\bar{q}_L + SQ_1\bar{q}_X + S(p_L + p_X) + q_H$ |
| 1 | 1 | 1 | 1 | X | X | $\Phi$ | $\Phi$ |
| 1 | X | 1 | 1 | X | X | $\Phi$ | $\Phi$ |
| X | 1 | 1 | 1 | X | X | $\Phi$ | $\Phi$ |
| 0 | X | 1 | 1 | 0 | 0 | $R\bar{S}\bar{p}_L\bar{q}_H + RP_1\bar{p}_X + R(q_L + q_X) + p_H$ | $\bar{R}S\bar{p}_H\bar{q}_L + S(p_L + p_X) + q_H$ |
| X | 0 | 1 | 1 | 0 | 0 | $RSp_Lq_H + R(q_L + q_X) + p_H$ | $\bar{R}Sp_Hq_L + SQ_1\bar{q}_X + S(p_L + p_X) + q_H$ |
| X | X | 1 | 1 | 0 | 0 | $R\bar{S}\bar{p}_L\bar{q}_H + R(q_L + q_X) + p_H$ | $\bar{R}S\bar{p}_H\bar{q}_L + S(p_L + p_X) + q_H$ |
| 1 | 0 | X | 1 | X | 0 | $\Phi$ | $SQ_1 + S(p_L + p_X) + q_H$ |
| 0 | 1 | X | 1 | X | 0 | $\Phi$ | $S\bar{Q}_1 + S(p_L + p_X) + q_H$ |
| 0 | 0 | X | 1 | X | 0 | $\Phi$ | $SQ_1 + S(p_L + p_X) + q_H$ |
| 1 | 1 | X | 1 | X | X | $\Phi$ | $\Phi$ |
| 1 | X | X | 1 | X | X | $\Phi$ | $\Phi$ |

FIG. 6B

| OLD OUTPUTS P | OLD OUTPUTS Q | NEW INPUTS R | NEW INPUTS S | NEW OUTPUTS P | NEW OUTPUTS Q | EQUATION FOR $P_2$ | EQUATION FOR $Q_2$ |
|---|---|---|---|---|---|---|---|
| X | 1 | X | 1 | X | X | $\phi$ | $\phi$ |
| 0 | X | X | 1 | X | 0 | $\phi$ | $S(p_L+p_X)+q_H$ |
| X | 0 | X | 1 | X | 0 | $\phi$ | $SQ_1+S(p_L+p_X)+q_H$ |
| X | X | X | 1 | X | 0 | $\phi$ | $S(p_L+p_X)+q_H$ |
| 1 | 0 | 1 | X | 0 | X | $R\overline{P}_1+R(q_L+q_X)+p_H$ | $\phi$ |
| 0 | 1 | 1 | X | 0 | X | $RP_1+R(q_L+q_X)+p_H$ | $\phi$ |
| 0 | 0 | 1 | X | 0 | X | $RP_1+R(q_L+q_X)+p_H$ | $\phi$ |
| 1 | 1 | 1 | X | X | X | $\phi$ | $\phi$ |
| 1 | X | 1 | X | X | X | $\phi$ | $\phi$ |
| X | 1 | 1 | X | X | X | $\phi$ | $\phi$ |
| 0 | X | 1 | X | 0 | X | $RP_1+R(q_L+q_X)+p_H$ | $\phi$ |
| X | 0 | 1 | X | 0 | X | $R(q_L+q_X)+p_H$ | $\phi$ |
| X | X | 1 | X | 0 | X | $R(q_L+q_X)+p_H$ | $\phi$ |
| 1 | 0 | X | 0 | X | X | $\phi$ | $\phi$ |
| 0 | 1 | X | 0 | 0 | 1 | $p_H$ | $S\overline{q}_H+p_H+q_L$ |
| 0 | 0 | X | 0 | X | X | $\phi$ | $\phi$ |
| 1 | 1 | X | 0 | X | X | $\phi$ | $\phi$ |
| 1 | X | X | 0 | X | X | $\phi$ | $\phi$ |
| X | 1 | X | 0 | X | X | $\phi$ | $\phi$ |
| 0 | X | X | 0 | X | X | $\phi$ | $\phi$ |
| X | 0 | X | 0 | X | X | $\phi$ | $\phi$ |
| X | X | X | 0 | X | X | $\phi$ | $\phi$ |
| 1 | 0 | 0 | X | 1 | 0 | $R\overline{p}_H+q_H+p_L$ | $q_H$ |
| 0 | 1 | 0 | X | X | X | $\phi$ | $\phi$ |
| 0 | 0 | 0 | X | X | X | $\phi$ | $\phi$ |
| 1 | 1 | 0 | X | X | X | $\phi$ | $\phi$ |
| 1 | X | 0 | X | X | X | $\phi$ | $\phi$ |
| X | 1 | 0 | X | X | X | $\phi$ | $\phi$ |
| 0 | X | 0 | X | X | X | $\phi$ | $\phi$ |
| X | 0 | 0 | X | X | X | $\phi$ | $\phi$ |
| X | X | 0 | X | X | X | $\phi$ | $\phi$ |
| 1 | 0 | X | X | X | X | $\phi$ | $\phi$ |
| 0 | 1 | X | X | X | X | $\phi$ | $\phi$ |
| 0 | 0 | X | X | X | X | $\phi$ | $\phi$ |
| 1 | 1 | X | X | X | X | $\phi$ | $\phi$ |
| 1 | X | X | X | X | X | $\phi$ | $\phi$ |
| X | 1 | X | X | X | X | $\phi$ | $\phi$ |
| 0 | X | X | X | X | X | $\phi$ | $\phi$ |
| X | 0 | X | X | X | X | $\phi$ | $\phi$ |
| X | X | X | X | X | X | $\phi$ | $\phi$ |

APPARATUS FOR PROPAGATING INTERNAL LOGIC GATE FAULTS IN A DIGITAL LOGIC SIMULATOR

GOVERNMENT CONTRACT

The invention herein claimed was made in the course of or under contract with the Department of the Army.

BACKGROUND OF THE INVENTION

1. Field of the Invention

This invention relates to machine-implemented processes for simulating digital logic circuitry. More particularly, this invention relates to an improvement in a prior art digital logic fault simulator program.

2. Description of the Prior Art

Recent years have witnessed an enormous growth in the fields of digital computation and control. This growth has been due to an appreciation of the power of digital systems which has coincided with increasingly sophisticated circuit fabrication techniques. As a result, it is now possible to build large scale systems capable of performing a variety of intricate tasks.

As the size of digital systems has increased, so have the problems associated with the maintenance of these systems. Maintenance problems are particularly acute in large digital systems because it is extremely difficult to predict the effect of a circuit fault, that is, a component that becomes short-circuited or open-circuited. Since maintenance implies the ability to detect error conditions and determine the source of the trouble from these conditions, a means, suitable for use in a large system, for correlating error conditions with system faults is required.

This correlation means would ideally take the form of a list, which might be called a fault dictionary, in which all of the error symptoms corresponding to each detectable fault are listed. An "error symptom" is defined to be the incorrect bit signal pattern that will actually exist in a monitored register due to the presence of some fault. The fault dictionary comprises lists of such signal patterns for each fault condition, and can be used by the digital system to translate a reported error symptom into an indication of the physical location of the fault.

The most obvious way to produce a fault dictionary would be to insert actual physical faults into the system and record the resulting error symptoms. This method would be very difficult for even the very smallest of systems, and would be practically impossible for a large system comprised of integrated circuit chips, each contraining many logic gates.

The only practical method of producing a fault dictionary for a large system is by using digital simulation methods. The simulation of a large system requires considerable effort since it is necessary in all cases to develop and store in a computer memory a representation of each circuit in the system which is to be simulated. Once this has been done, a considerable amount of computation time is required to execute a program capable of performing the actual fault simulation upon the stored representation of the system.

One particular solution to this need for a method of simulating logic faults in a large digital logic system is the machine-implemented process disclosed in the copending application of D. B. Armstrong, U.S. Pat. Ser. No. 36,581, which is assigned to the same assignee as is the present invention. The simulator program disclosed therein will be hereinafter referred to as the "Armstrong simulator."

The Armstrong simulator operates by "propagating" fault lists associated with each input to a logic gate through the gate in accordance with certain algorithms, and also by propagating any internal faults of the gate through the gate in an appropriate manner. This process may be briefly explained as follows.

Each input terminal of each gate has associated therewith a list of fault entries termed an "input fault list." Each list has an entry for each possible fault that, if actually present in the hardware, would cause the binary logic signal applied to the associated terminal to be complemented. A fault that affects an input signal to a gate is considered to be detectable at the output of the gate if its effect on the input signal causes the error-free output signal of the gate to be complemented. Thus an input fault entry is placed on the gate's output fault list if it is determined that the corresponding fault is detectable at the gate's output terminal. Similarly, those faults internal to the gate that are determined to be detectable at the gate's output terminal are placed on the output fault list. The gate's output fault list then becomes an input fault list for all of the input terminals of other gates to which the gate's output terminal is connected. This process of determining which of the gate's internal faults and which of the fault entries on the gate's input fault lists should appear on the gate's output fault list is termed "propagating" the fault lists.

When a gate is on a feedback loop, that is, when one or more of its inputs is derived from and can be traced back to its output, the application of the algorithms of the Armstrong simulator may result in an inaccurate propagation of the internal faults of the gate, thereby decreasing the precision with which fault detection can be performed. The inaccurate propagation of internal faults results because the Armstrong simulator does not recognize that a fault appearing on a gate's input fault list may actually be one of the gate's internal faults that has been fed back to its input. When this occurs it is necessary to consider the total effect of the fed back internal fault, rather than separately considering it first as an input fault and then as an internal fault as does the Armstrong simulator. The total effect must be considered because of the possibility that internal faults that are not detectable without the feedback become detectable because of the feedback, and, conversely, that internal faults that are detectable without the feedback are found not to be detectable when the feedback is taken into account.

Therefore, it is an object of this invention to accurately simulate the effects of faults in a digital logic circuit.

It is a specific object of this invention to accurately propagate faults that are internal to a logic device.

It is a more specific object of this invention to accurately propagate internal faults through logic devices that are on loops.

SUMMARY OF THE INVENTION

These objects are achieved for digital devices on feedback loops in accordance with this invention through the use of methods of propagating internal faults that compute the total effect on the device's output of a fault that acts internally on the device and also externally in that, due to the feedback, the internal fault also complements one or more of the error-free input logic values of the device. The method has two basic embodiments comprising its application to logic gates that are on loops and its application to flip-flops that are on loops.

Internal faults are propagated through gates on feedback loops in accordance with this invention by using a special table look-up procedure. Each fault entry on any of a loop gate's input fault lists that corresponds to an internal fault of the gate is considered separately. The faulty input bit pattern that would result from each different internal fault entry that appears as an input fault entry on one or more input fault lists is first computed. This is done by forming a digital word wherein each bit corresponds to the error-free input logic value of one of the input terminals of the gate. Then each bit of the digital word corresponding to an input terminal on whose input fault list the internal fault under consideration appears is complemented. The result, termed the "faulty input bit pattern" and the fault number of the fault under consideration are then used to access the Armstrong Fault Truth Table for the gate. This table contains a list of all possible inputs to the gate and a list of those detectable internal faults that correspond to each input. If the output logic value found in the table differs from the error-free output logic value, then the fault entry under consideration is placed on the gate's output fault list. Finally, the error-free input bit pattern is used to access the table to determine the detectability of any other internal faults that do not appear on the input fault lists. If any of these faults are detectable, they are added to the output fault list of the gate.

Internal faults are propagated through loop flip-flops in accordance with this invention by accessing a novel equation table that contains, for each possible combination of old outputs and new inputs, the proper relationship of the current output fault lists to the current input fault lists, the previous output fault lists, and the internal faults of the flip-flop.

BRIEF DESCRIPTION OF THE DRAWING

FIG. 1A shows a three-input NOR gate that is used to illustrate the concept of a logic gate that is on a loop;

FIG. 1B is the Fault Truth Table corresponding to the NOR gate shown in FIG. 1A;

FIG. 2 shows a three-input NOR loop gate that is used to illustrate the application of the novel process of this invention to gates that are on loops;

FIGS. 6A and 6B are an equation table that summarizes the propagation of faults through flip-flops that are on loops;

FIG. 8C illustrates a data table used by the process shown in the flow chart of FIGS. 8A and 8B.

DETAILED DESCRIPTION

Figure 3:
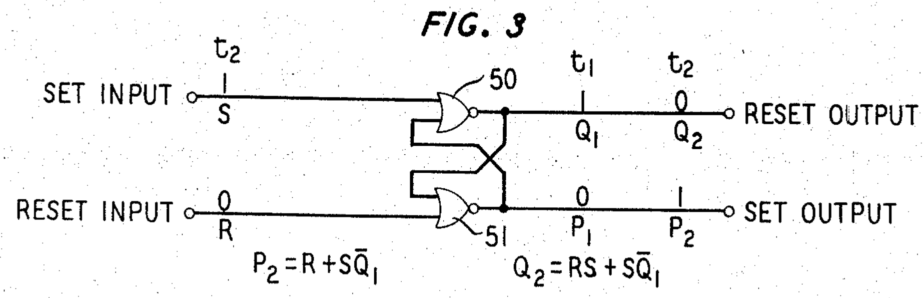
FIGS. 3, 4, and 5 illustrate the manner in which a NOR loop flip-flop may be analyzed to generate the equation table of FIGS. 6A and 6B.

This invention may best be understood by a more detailed discussion of how the straightforward application of the algorithms of the Armstrong simulator to gates that are on feedback loops may result in an inaccurate propagation of the internal faults of the gates.

The Armstrong simulator propagates faults through each logic gate by means of a two-step procedure. First, the input fault lists of the gate (lists of faults which might appear at the input of the gate) are propagated through the gate to form the output fault list of the gate. The particular internal faults of the gate which will cause the gate's error-free output to be complemented are then added to the output fault list.

For example, if the logic gate is a NOR gate, the input fault lists are propagated through the gate by using Armstrong's NOR algorithm, which is as follows:

Compute the set intersection, denoted "I," of all the input fault lists associated with "1" inputs. Compute the set union, denoted "U," of all the input fault lists associated with "0" inputs. If there are any "1" inputs, the output fault list is found by subtracting the union list from the intersection list, that is, by computing I - U. If all error-free input logic values are "0" then the result is the set U.

The reasoning behind this algorithm is as follows. As is well known, a NOR gate's output is a "1" if and only if all of its inputs are "0." Thus if a gate's error-free input logic values are all "0," any input fault causing one or more of the input logic values to be complemented will complement the error-free output logic value and hence be detectable. The faults to be propagated are thus all in set U. If the gate's error-free input logic values are not all "0," then an input fault will be detectable only if it causes all of the "1's" on the gate's input to change to "0's" and, at the same time, does not cause any of the "0's" on the gate's inputs to change to a "1." From this it follows that only those faults that are associated with every "1" input and with no "0" input are detectable. These faults are exactly what the expression I - U computes.

The second step, propagating the internal faults of the gate, is performed by accessing a Fault Truth Table. This table contains, for each type of logic element, a list of all possible inputs to that element and the list of those detectable internal faults that correspond to each input. Since each different type of logic element is susceptible to its own unique internal faults, the internal faults that can occur for each type of device used in a system must be determined by experimental techniques. Each type of device thus has its own unique Fault Truth Table. Once the error-free input to a gate has been determined, the internal faults to be added to that gate's output fault list are those faults that are associated with that input in its Fault Truth Table.

The fault propagation performed by the Armstrong simulator, and the manner in which it can result in the inaccurate propagation of internal faults of gates on loops, may be more readily understood by a consideration of the following example.

FIG. 1A shows a three-input NOR gate and FIG. 1B depicts an exemplary Fault Truth Table for the gate. The table of FIG. 1B shows each possible input logic value combination and the associated error-free output logic value. It is presumed that the NOR gate of FIG. 1A has eight unique internal faults and that these are identified in the table of FIG. 1B by the numbers 1 through 8. The column of logic values under each internal fault gives the output of the gate that will result, assuming the existence of the fault, for each of the associated input logic values. Thus, if internal fault 1 exists, then the gate's output will be "0" independent of the gate's input logic values. Similarly, if internal fault 6 exists and the input logic values are "100," the gate's output logic value is "1." This means that internal fault 6 is detectable at the gate's output because the error-free output should be "0" for an input of "100." For each set of input logic values shown in FIG. 1B, a square is placed in the column of each detectable internal fault. The right-hand column summarizes the table.

Returning then to the NOR gate of FIG. 1A, it is assumed for the purposes of this example that the gate's error-free inputs are "100" and that the input fault lists are $L_1$, $L_2$, and $L_3$, while the output fault list is L. It is further assumed that the gate is on a loop such that inputs 10 and 11 can be traced back to output 13, thereby causing internal fault number 7 of the gate to appear as a fault entry on both of input fault lists $L_1$ and $L_2$.

Proceeding then to apply the NOR algorithm of the Armstrong simulator, it can be seen that the output fault list, L, is $$L = L_1 - (L_2 + L_3) \quad (1)$$

It can be seen from equation (1) that the NOR algorithm will not result in internal fault 7 being on list L. The second step of the Armstrong simulator, using the error-free input logic value "100" to access the table of FIG. 1B, would result in internal faults 2, 5, 6, and 8 being added to the output fault list L. Neither step would cause internal fault 7 to be on list L. This is incorrect since, as shown below, fault 7 is detectable and hence should be a member of list L. This error results because the Armstrong simulator treats faults internal to a gate as separate and distinct from any input faults, thereby ignoring the effects of the interdependence caused by feedback loops.

If internal fault 7 is actually present, then, as can be seen from FIG. 1A, the actual input logic value to the gate will not be the error-free value "100" but will instead be the fault input "010." Referring to the Fault Truth Table of FIG. 1B, it can be seen that if fault 7 actually exists, and if the input bit pattern is "010," the output of the gate will be a "1." This value differs from the gate's error-free output logic value of "0" and therefore it is true that fault 7 can actually be detected at the output of gate 15. It should be noted that fault 7 would not be detected if NOR gate 15 were a nonloop gate which had the true input "100," or if NOR gate 15 were a loop gate having the error-free inputs "100" and fault 7 did not exist in both $L_1$ and $L_2$.

It can therefore be seen that the straightforward application of the propagation algorithms of the Armstrong simulator may generate an incorrect simulation of gates that are on loops due, in general, to the inability of the simulator to account for the fact that an entry on the gate's input fault list may, in fact, be one of the gate's own internal faults.

The apparatus and method of this invention uses the Fault Truth Table of the Armstrong simulator in a new way that results in the accurate propagation of internal faults through gates that are on loops. Additionally, a novel equation table is disclosed that permits an accurate simulation of flip-flops that are on loops. The propagation of internal faults through loop gates will be considered first.

Each internal fault that appears in at least one of the input fault lists to the gate is treated separately. The faulty input logic value pattern that would be caused by a particular internal fault appearing on a gate's input fault lists is used to determine the behavior of the gate. If the Fault Truth Table for the gate indicates that the output logic value of the gate that is produced by the faulty input pattern differs from the error-free output logic value of the gate, then that internal fault is included in the output fault list. If the existence of the fault does not alter the error-free output value of the gate, then the fault is not detectable at the gate's output and is hence not included in the output fault list of the gate. This process of analysis is performed for each individual internal fault appearing on the input fault lists to the gate. When this process has been completed, the error-free input logic value to the gate is used to access the Fault Truth Table and any of the detected internal faults associated with the error-free input that do not appear in any input fault list are also included in the output fault list for the gate.

This algorithm may best be understood by a consideration of its application to NOR gate 25 shown in FIG. 2. As shown in FIG. 2, NOR gate 25 is a three-input NOR gate having an error-free input logic value of "100," an error-free output logic value of "0," and input fault lists $L_1$, $L_2$, and $L_3$. It can further be seen that input fault list $L_1$ includes internal faults 1 and 4, input fault list $L_2$ includes internal faults 4, 5, and 6, and input fault list $L_3$ contains internal fault 5. Since NOR gate 25 is of the same type as NOR gate 15 shown in FIG. 1A, the Fault Truth Table shown in FIG. 1B also applied to NOR gate 25 shown in FIG. 2. The analysis thus proceeds as follows.

First, consider internal fault 1 which is contained in input fault list $L_1$. The existence of fault 1 causes the input logic value to the gate to be "000." Referring to FIG. 1B, this input logic value in combination with the presence of internal fault entry number 1, is seen to cause the output logic value to be a "0." However, since the error-free logic value of the gate is "0," the presence of fault 1 cannot be detected at the output of the gate and hence fault 1 is not included in output fault list L.

Fault 4 is seen to be included in both the input fault lists $L_1$ and $L_2$. The existence of fault 4 causes the input logic value to be "010" and, referring to FIG. 1B, it is seen that a "010" input logic value in the presence of fault 4 causes the output logic value of the gate to go to a "1." Since this differs from the error-free output logic value of the gate, fault 4 is detectable at the output of the gate and is hence included in output fault list L.

Fault 5 will cause the input logic value to the gate to be "111" and, referring to FIG. 1B, it is seen that fault 5 will hence not be detectable. This is true even though fault 5 would be included in the set of internal faults that would ordinarily be detected for a gate having the error-free input "100."

The presence of fault 6 will cause the input logic value to be "110" and, from FIG. 1B, it is seen that this will cause the output logic value to be a "1." Fault 6 is thus detected and fault 6 therefore appears in the output fault list L.

Finally, the Fault Truth Table of FIG. 1B is accessed using the error-free input logic value, that is, "100." The associated faults that are listed in the table as being detected are faults 2, 5, 6, and 8. Of these, faults 2 and 8 are the only internal faults that do not appear in any of the input fault lists $L_1$, $L_2$, or $L_3$. Hence, internal faults 2 and 8 in accordance with this algorithm are also added to the output fault list L. The output fault list L therefore comprises internal faults 2, 4, 6, and 8.

It will be appreciated that the portion of this invention dealing with logic gates is concerned solely with the propagation of internal faults through a gate on a loop. In addition to the process performed by the apparatus of this invention, a complete simulation of each gate would also include the application of the NOR algorithm of the Armstrong simulator to the propagation of faults appearing on the input fault lists which are not internal faults.

The simulation of flip-flops that are on loops is less straightforward than the simulation of NOR gates on loops because of the memory capacity of flip-flops. When the flip-flop is a loop flip-flop, then the effect of faults internal to the flip-flop must be determined by analyzing each possible combination of current inputs and previous outputs. The result of this analysis is shown in the table of FIGS. 6A and 6B. This table contains the proper equations, corresponding to all possible combinations of previous error-free output logic values and current error-free input and output logic values, for computing the current output fault lists of the flip-flop. The term "$\phi$" is used in the table to denote the null set while "$x$" is used to indicate an unknown logic value.

An understanding of FIGS. 6A and 6B may best be obtained by a consideration of the following detailed explanation of one of the entries in the table. The entry under consideration is the entry in FIG. 6A having old outputs "01," new inputs "01," and new outputs "10." These conditions are shown applied to the flip-flop of FIG. 3.

The flip-flop shown in FIG. 3 is assumed to have been placed in the reset state at some time $t_1$. At some time during the interval $t_1,t_2$, where $t_2$ is a later time than $t_1$, a "1" is applied to the set input causing the flip-flop to change to the set state. In accordance with the terminology of the Armstrong simulator, the output fault list for the reset output of the flip-flop is denoted by the letter "Q" while the output fault list for the set output is denoted by the letter "P." Similarly, the input fault lists are denoted "R" and "S." These four letters appear subscripted in FIG. 3 to indicate the time at which the associated fault lists are computed. Individual faults are denoted by lower case letters to distinguish them from fault lists.

As shown in FIG. 3, the output fault lists at time $t_2$, that is, $P_2$ and $Q_2$, are dependent not only on the current input fault lists R and S, but also on the previous output fault list $Q_1$. The expressions for $P_2$ and $Q_2$ shown in FIG. 3 may be derived in accordance with the algorithm disclosed in the aforementioned copending patent application. The expressions do not reflect the effect of internal faults in the flip-flop itself. It may therefore be appreciated that each entry in the table of FIGS. 6A and 6B is derived by appropriately modifying the expressions given in the table of FIGS. 3D and 3E of the aforementioned copending patent application.

The internal faults of a cross-coupled NOR gate flip-flop are defined below in Table 1.

TABLE 1

$q_H$ = Reset output stuck high (stuck-at-one)
$q_L$ = Reset output stuck low (stuck-at-zero)
$q_X$ = Reset feedback output open (i.e., feedback input to the set side open)
$p_H$ = Set output stuck high
$p_L$ = Set output stuck low
$p_X$ = Set feedback output open (i.e., feedback input to the reset side open)

Each of these internal faults must be examined for each configuration of the true logic values of the flip-flop to determine whether it is detectable at the flip-flop outputs. The manner in which this is done is illustrated in the following discussion for the particular flip-flop state shown in FIG. 3.

When the fault $q_H$ is present in a flip-flop it causes the reset output to be stuck at one. Since the reset output is fed back to the NOR gate on the set output side, gate 51 shown in FIG. 3, the presence of fault $q_H$ causes the set output to remain at "0" irrespective of the logic level applied to the reset input. The effect of fault $q_H$ on the flip-flop of FIG. 3 at time $t_2$ is therefore to complement the error-free "0" logic value on the reset output and to complement the error-free "1" logic value on the set output. Thus $q_H$ should be included as a fault entry in both the output fault lists $P_2$ and $Q_2$. The expressions for $P_2$ and $Q_2$ are thus initially modified to be $$P_2 = R + S\bar{Q}_1 + q_H \qquad (2)$$

$$Q_2 = RS + S\bar{Q}_1 + q_H$$

When the fault $q_L$ is present in a flip-flop it causes the reset output to be stuck at zero. The presence of fault $q_L$ should not be detected on the reset output of the flip-flop shown in FIG. 3 since the error-free logic value is "0." Note, however, that the present expression for $Q_2$ as shown in Equations (2) includes the term "RS." Therefore if a fault entry pertaining to fault $q_L$ is in fact contained in both the R and S fault lists, then the expression for $Q_2$ as shown in Equations (2) would indicate that fault $q_L$ is detected at the reset output. This would be incorrect. Thus the term "RS" in the expressions for $Q_2$ should be replaced by the term "$RS\bar{q}_L$" which denotes the set of all fault entries that are in both R and S with the exception of $q_L$. Furthermore, the fault $q_L$ is properly an entry in fault list $Q_1$ because the error-free output of the flip-flop at time $t_1$ is "1." Since $q_L$ is in set $Q_1$, it is obviously not in the set $S\bar{Q}_1$ and hence the second term in the expression for $Q_2$ of Equations (2) is correct.

Turning then to the expression for $P_2$ in Equations (2), it is true that $q_L$ will complement the set output only if the fault appears in input fault list R. Thus the expression for $P_2$ given in Equations (2) provides for the correct detection of fault $q_L$. Thus at this point in the analysis the expressions for $P_2$ and $Q_2$ are as shown in Equations (3).

$$P_2 = R + S\bar{Q}_1 + q_H \qquad (3)$$

$$Q_2 = RS\bar{q}_L + S\bar{Q}_1 + q_H$$

Turning then to the third internal fault in Table 1, $q_X$, it can be seen that the existence of fault $q_X$ will cause the flip-flop to behave as though the feedback output from the reset side were missing. The flip-flop would thus be essentially as shown in FIG. 4.

Figure 4:
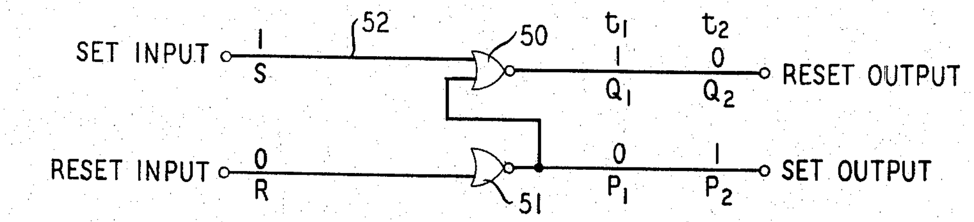

As can be seen from FIG. 4, the presence of fault $q_X$ in the flip-flop will cause the reset output to be complemented if and only if both inputs to NOR gate 50 are thereby forced to the "0" state. In order to have this effect on gate 50, fault $q_X$ must at least appear as an entry in both input fault lists S and R. If $q_X$ appears as a fault entry in input fault list S, then the input to gate 50 on line 52 will be the faulty value "0." If $q_X$ appears as a fault entry in input fault list R, then the output of gate 51 will be "0" and hence the output of gate 50 at time $t_2$ will be the faulty value "1." The fault $q_X$ should therefore be included as an entry in output fault list $Q_2$ if and only if it is present in the set RS. The first term of the expression for $Q_2$ shown in Equations (3) takes care of this possibility. By a similar analysis, fault $q_X$ belongs in the expression for $P_2$ only if it exists in input fault list R. The expression for $P_2$ as shown in Equations (3) is seen to include this case.

Considering fault $p_H$ next, it is seen that this fault has the same effect on the set output as fault $q_H$ has on the reset output. It is apparent that in the configuration shown in FIG. 3 fault $p_H$ is not detectable at either flip-flop output at time $t_2$ because the existence of this fault does not alter the error-free output logic value of either output line at time $t_2$. Therefore, the expressions for $P_2$ and $Q_2$ must exclude the fault entry corresponding to fault $p_H$.

Turning to the expression for $P_2$ shown in Equations (3), it can be seen from FIG. 3 that the term $S\bar{Q}_1$ excludes the element $p_H$. Fault $p_H$ is clearly an element of $P_1$ since the presence of fault $p_H$ at time $t_1$ would cause the error-free set output logic value of "0" to be complemented. This, in turn, would cause gate 50 to be inhibited and would hence cause the error-free reset output to be complemented. Fault $p_H$ is therefore an element of $Q_1$ and is hence not an element of the term $S\bar{Q}_1$.

However, because $p_H$ may appear in either of the terms "R" or "$RS\bar{q}_L$," these terms must be replaced, respectively, with the terms "$R\bar{p}_H$" and "$RS\bar{q}_L\bar{p}_H$."

The expressions for $P_2$ and $Q_2$ are at this point:

$$P_2 = R\bar{p}_H + S\bar{Q}_1 + q_H \tag{4}$$

$$Q_2 = RS\bar{q}_L\bar{p}_H + S\bar{Q}_1 + q_H$$

The next internal fault listed in Table 1 is fault $p_L$. This fault has the same effect on the set output as fault $q_L$ has on the reset output. Fault $p_L$ is an element of fault list $P_2$ because the effect of the presence of this fault in the flip-flop is to force the set output to the faulty "0" state.

If $p_L$ is also present in set input fault list, S, then both inputs to NOR gate 50 will be "0," thereby forcing the reset output to the faulty "1" state. Therefore, if $p_L$ in fact is an element of input fault list S, it should be included in output fault list $Q_2$. The expressions for the output fault lists are thus as shown in Equations (5).

$$P_2 = R\bar{p}_H + S\bar{Q}_1 + q_H + p_L \tag{5}$$

$$Q_2 = RS\bar{q}_L\bar{p}_H + S\bar{Q}_1 + q_H + Sp_L$$

Figure 5:
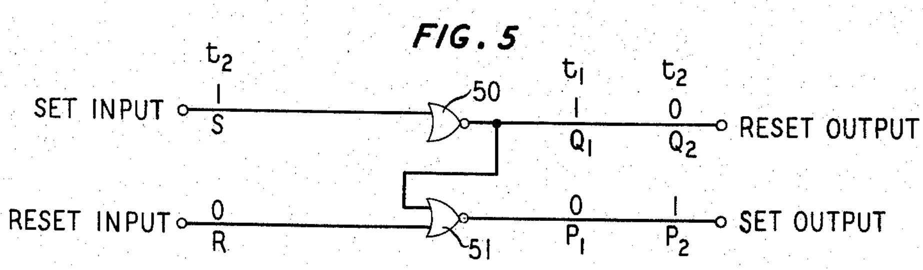

Finally, if fault $p_X$ exists, then the flip-flop behaves as though the feedback output frm the set side is missing as shown in FIG. 5. If fault $p_X$ exists as an entry in input fault list S, then the reset output at time $t_2$ is forced to a fault "1" logic level irrespective of whether $p_X$ is an element of $Q_1$. The set output is thereby forced to a "0" logic level because of the feedback of the reset output to the input of gate 51. Thus the term "$Sp_X$" must be added to the expressions for $P_2$ and $Q_2$. The fault $p_X$ also complements the set output if it is an element of R. The current expression for $P_2$ shown in Equations (5) with the addition of the term "$Sp_X$" correctly detects $p_X$ in this case.

The final expressions for $P_2$ and $Q_2$, taking into account all of the internal faults in Table 1, are $$P_2 = R\bar{p}_H + S\bar{Q}_1 + q_H + p_L + Sp_X \tag{6}$$

$$Q_2 = RS\bar{q}_L\bar{p}_H + S\bar{Q}_1 + q_H + S(p_L + p_X)$$

All of the other entries in the equation table of FIGS. 6A and 6B may be derived in an analogous fashion, and, in fact, that is precisely the way the table was developed. This process need be performed only once for a given set of recognized internal flip-flop faults. Once generated, the equation table may be utilized by a machine process through the simple expedient of using the previous error-free output logic values and the current error-free input and output logic values to access the table to retrieve the correct set of equations. The new output fault lists may then be computed using these equations.

Figure 7:
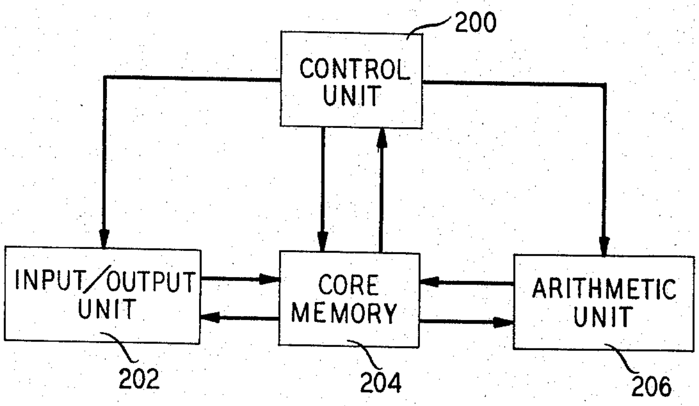
FIG. 7 illustrates the structure of a general purpose digital computer suitable for performing the machine method of the present invention.

The above-disclosed methods of propagating internal faults through logic gates and flip-flops that are on loops may easily be adopted for implementation as machine processes for execution by a general purpose digital computer. In particular, these processes can be programmed in the form of subroutines which can be called by the program disclosed in the aforementioned copending patent application. The manner in which this can be done will be readily apparent to those skilled in the art. For example, the processes can be programmed in either assembly language or a higher level language. In either event, the processes can be practiced by using any general purpose digital computer of the type, as shown in FIG. 7, having a control unit 200, an input/output unit 202, a core memory 204, and an arithmetic unit 206.

Figure 8A:
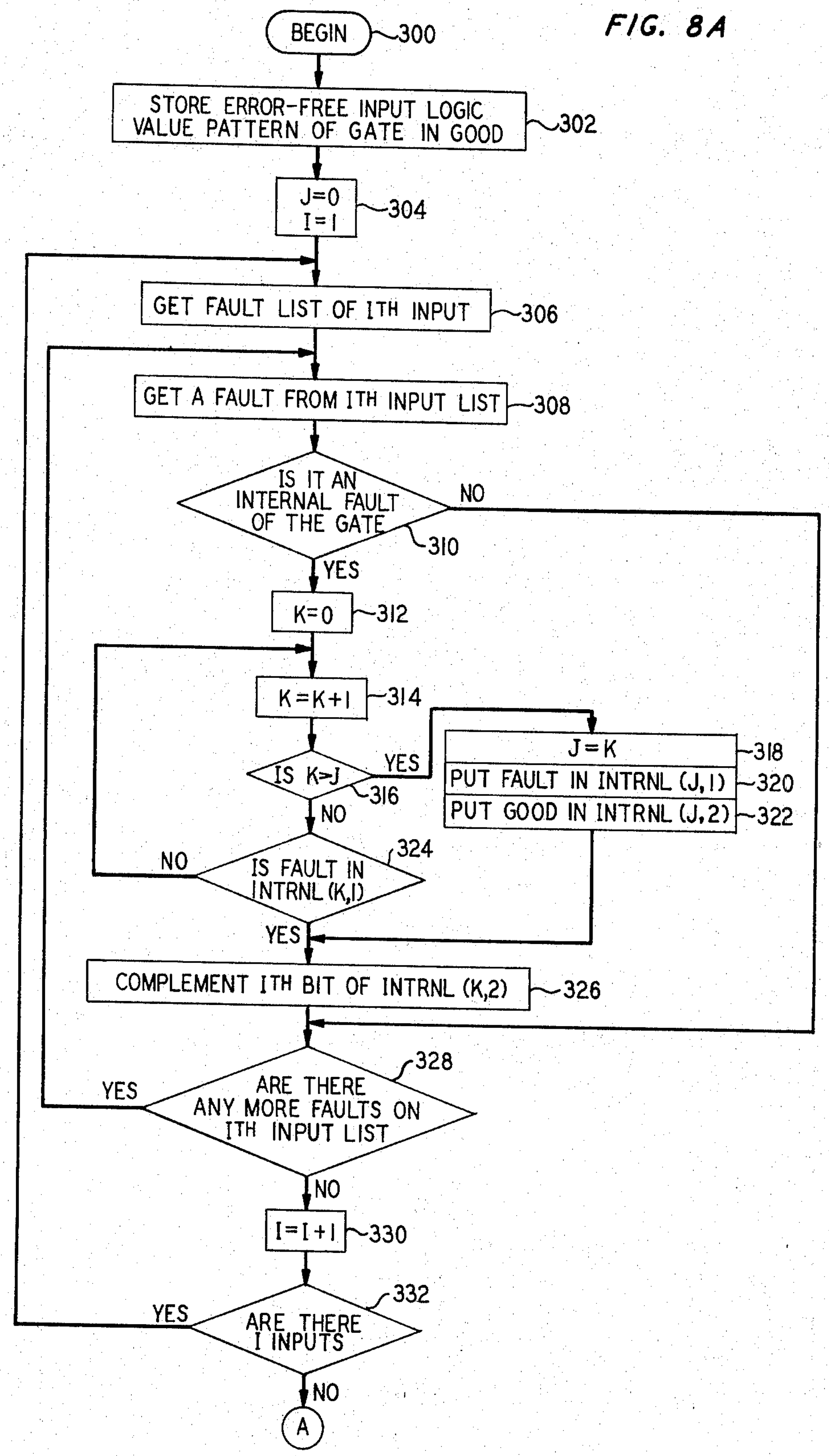
FIGS. 8A and 8B are a flow chart showing the operational steps of the portion of this invention pertaining to loop gates.
Figure 8B:
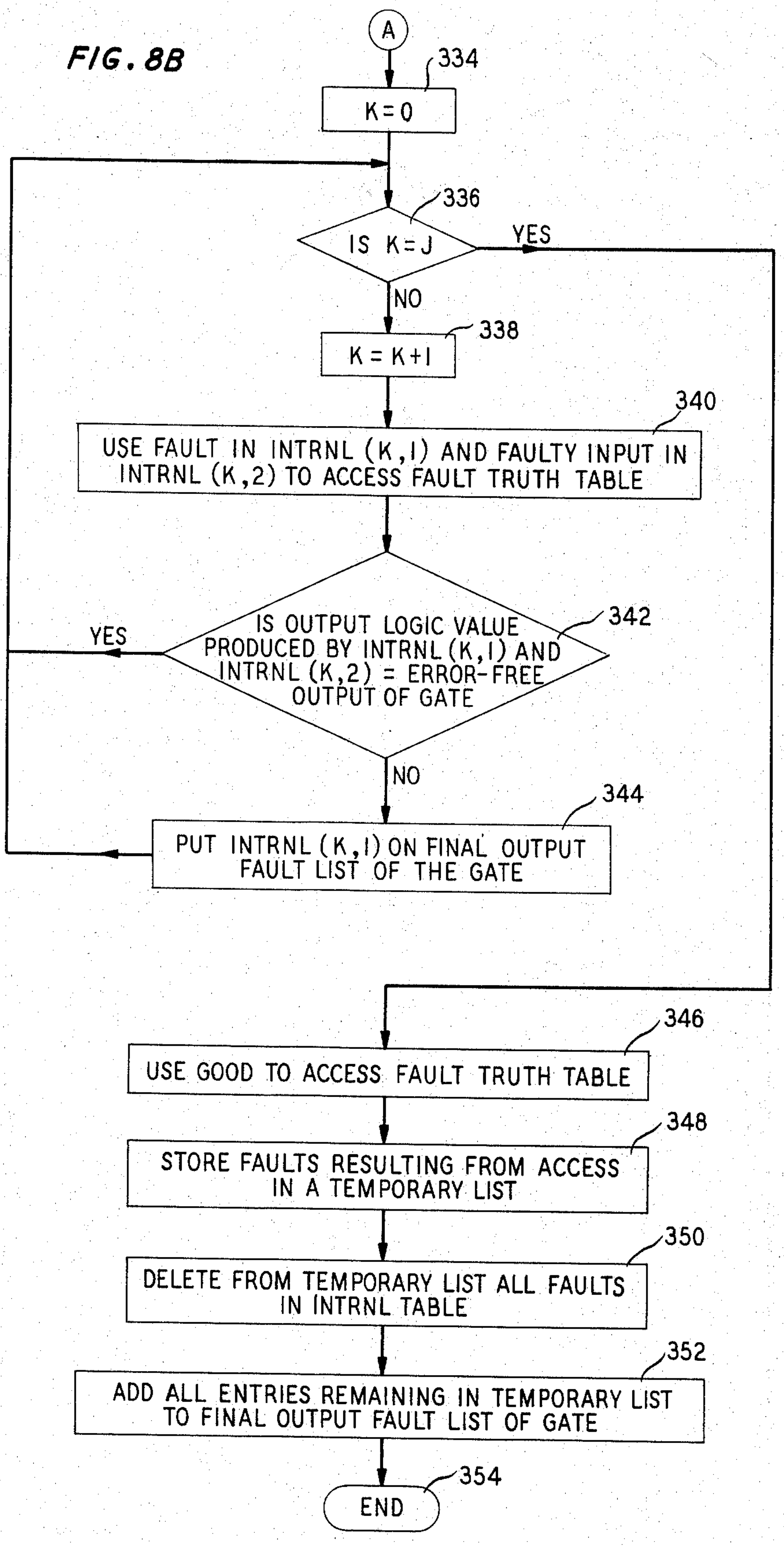
Figure 9:
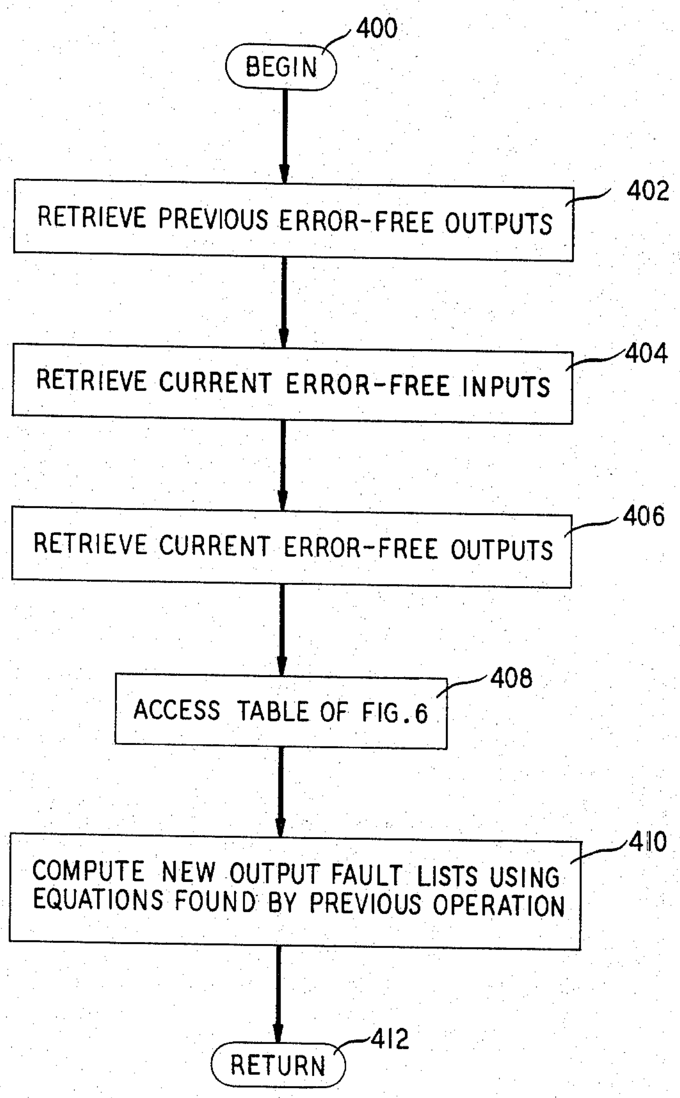
FIG. 9 is a flow chart showing the operational steps of the portion of this invention pertaining to loop flip-flops.

The manner in which the instant processes may be adapted for execution by a general purpose digital computer may be more readily understood with the aid of the flow charts of FIGS. 8A, 8B, and FIG. 9. The flow charts can be seen to include four different symbols. The oval symbols are "terminal indicators" and signify the beginning and end of a particular program segment. The rectangles, termed "operation blocks," contain the description of a particular detailed operational step of the process. The diamond-shaped symbols, termed "conditional branch points," contain the description of a particular decisional step of the process. The circles are merely used as drawing aids to connect lines of flow between sheets.

Referring then to FIG. 8A, the process of propagating internal faults through a logic gate begins at terminal indicator 300.

The first step, shown as operation block 302, is to store the error-free input logic value pattern of the gate under consideration in a location termed "GOOD." Assuming the instant process to be implemented as a subroutine to be executed in conjunction with the machine process of the Armstrong simulator, the error-free input logic value pattern would be available as a result of operation block 432 shown in FIG. 8B of the Armstrong simulator.

Next, operation block 304 initializes two indexes. The index J is used to count the number of internal faults that appear on the input fault list of the gate under consideration. The index I, which is initialized to the value of "1," is used to keep track of which of the input fault lists is currently being considered.

Operation block 306 then fetches the fault list corresponding to the Ith input. During the first pass through operation block 306 this will be, of course, the fault list associated with the first input to the gate.

Operation 308 then accesses the first fault on the Ith input fault list. Conditional branch point 310 determines whether the fault just accessed from the fault list is an internal fault of the gate. If not, control is transferred to conditional branch point 328 which determines whether there are any other faults on the Ith input fault list. If the fault accessed by operation block 308 is an internal fault of the gate, conditional branch point 310 transfers control to operation block 312.

Operation block 312 initializes another index, K, which serves as an index into the INTRNL table. The INTRNL table is used to store the fault numbers of all internal faults to the gate that appear on the gate's inputs. Each unique internal fault has associated therewith the erroneous input logic value pattern that will result from the presence of the fault. The table is built by first associations in the table a copy of the error-free logic value for every unique internal fault. This copy is then modified by complementing each bit in the pattern corresponding to an input at which the associated fault is present. For example, the gate shown in FIG. 2 would have the INTRNL table shown in FIG. 8C.

Operation block 314 next increments K and transfers control to conditional branch point 316. Conditional branch point 316 determines whether the current value of the index K exceeds the current value of the index J. If it does, this signifies that the INTRNL table has been exhausted without finding the fault under consideration. In this case, the fault is entered into the table. This is done as follows. First, the index J is set equal to the current value of index K by operation block 318. Operation block 320 then puts the number of the fault under consideration into the INTRNL table at the (J,1) position. Operation block 322 stores the value of GOOD in the INTRNL table in position (J,2). Operation block 322 then transfers control to operation block 326.

If conditional branch point 316 determines that the current value of K is not greater than J, then conditional branch point 324 tests whether the fault under consideration is contained in the INTRNL table at the (K,1) position. If not, control is returned to operation block 314 to allow accessing the next entry in the table. If so, control is transferred to operation block 326 and the Ith bit of the INTRNL table entry (K,2) is complemented. Next conditional branch point 328 determines whether any faults remain on the Ith input list. If so, control loops back to operation block 308 to get the next fault from the Ith input list. If not, operation block 330 increments the index I and transfers control to conditional branch point 332.

Conditional branch point 332 determines whether the gate has I inputs, that is, whether there are any more inputs to be processed. If there are, control is returned to operation block 306 to begin processing the fault list associated with the Ith input. If there are not, control is transferred to operation block 334 shown in FIG. 8B.

When the process reaches operation block 334, then the INTRNL table has been completed. This table may now be used to access the fault truth table to determine which of the internal faults appearing on the gate's input fault list are detectable. This is done as follows.

Operation block 334 resets the index K to zero. Conditional branch point 336 then tests whether K equals J. If it does, this indicates that the INTRNL table has been completely searched and control is transferred to operation block 346. The only time this would actually occur on the first pass through conditional branch point 336 would be if there were no internal faults in the input fault list of the gate under consideration. If the test performed in conditional branch point 336 indicates that K does not equal J, operation 338 increments the index K and transfers control to operation block 340.

Operation block 340 accesses the fault truth table associated with the type of gate under consideration by using the fault number stored in the (K,1) entry of the INTRNL table and the faulty input logic value stored in the (K,2) position in the table. This access determines the output logic value. Conditional branch point 342 then tests whether the output logic value found by accessing the fault truth table is the same as the error-free output of the gate. If it is, this means that the internal fault is not detectable and hence control is merely transferred back to conditional branch point 336. If it is not the same, this means that the internal fault under consideration that appears on the input fault list of the gate is detectable at the output of the gate and hence operation block 344 puts that fault number, that is, the (K,1) entry of the INTRNL table, on the final output fault list of the gate. Control is then returned to conditional branch point 336.

It can thus be seen that the loop comprising conditional branch point 336 to operation block 344 serves the purpose of placing in the final output fault list those fault entries that correspond to internal faults of the gate appearing on the gate's input fault list that are detectable at the gate's output. When this process has been completed control is transferred to operation block 346.

Operation block 346 uses GOOD to access the fault truth table. That is, the error-free input logic value is used to access the fault truth table. Operation block 348 stores the faults resulting from this access in a temporary list. Operation block 350 deletes from the temporary list all faults that have previously been stored in the final output fault list. Finally, operation block 352 adds all entries remaining in the temporary list to the final output fault list of the gate, and the process ends at terminal indicator 354.

The flow chart of FIG. 9 illustrates the simple process of using the equation table of FIGS. 6A and 6B to propagate internal faults through a flip-flop that is on a loop.

The process begins at terminal indicator 400. The first step, shown in operation block 402, is to retrieve the values of the previous error-free outputs. The second step, shown in operation block 404, is to retrieve the current error-free input to the flip-flop under consideration. The third step, block 406, is to retrieve the current error-free output. When the steps shown in operation blocks 402, 404, and 406 have been completed, the process has enough information to perform the step shown in operation block 408, namely, to access the equation table. The final computational step in the process is to use the equation found by the access of operational block 408 to compute the new output fault list. The process then terminates at terminal indicator 412.

What is claimed is:

1. An improved digital computer of the type where circuitry is internally connected when a stored list of instructions is processed by a central processing unit, said computer being used for simulating the propagation of internal faults of a logic device on a feedback loop, wherein the improvement comprises;

1. a first storage circuit for a plurality of signals, said signals representing fault lists for each input terminal of said logic device, said fault lists consisting of external faults, and internal faults of said logic device which appear as inputs to the device through a feedback loop;

2. a second storage circuit for a sequence of signals, each signal corresponding to the error-free input logic value of one of the input terminals of the logic device;

3. a third storage circuit for storing the error-free output value of the logic device which results when said error-free input logic values are applied to the device;

4. a fourth storage circuit for a plurality of signal sequences representing input logic values and corresponding signals representing error-free output logic values, internal faults, and logical effects values for said logic device, said input logic values comprising every combination of logic values possible on the leads of said logic device;

5. a signal control circuit responsive to said first storage circuit, said control circuit testing in turn each fault list corresponding to said input terminal, then examining in turn each internal fault in said fault list, then transferring control to, a. a generating circuit for replicating the sequence of signals stored in said second storage circuit, except for the complimenting of the signal corresponding to the said input terminal under test, and then to b. a first testing circuit for comparing the signal sequence generated by said generating circuit with said plurality of signals sequences stored in said fourth storage circuit until an exact match occurs, and then to c. a signal output circuit responsive to said matching signal sequence of said first testing circuit and said internal fault of said signal control circuit for the extraction of said logical effect signal corresponding to said matching signal sequence and said internal fault from said fourth storage circuit, and then to d. a second testing circuit for comparing said extracted logical effect signal of said signal output circuit with said error-free output value of said third storage circuit, said second testing circuit producing a test signal of a first type if said logical effect signal and said error-free output value are the same, and producing a test signal of a second type otherwise, and then to e. an output storage circuit for storing said internal fault if said test signal is of said second type.

2. The computer of claim 1 wherein the improvement further comprises;

a third testing circuit for comparing the error-free input logic value signal sequence of said second storage circuit with said plurality of signal sequences stored in said fourth storage circuit, until an exact match occurs;

a second output signal circuit responsive to said matched signal sequence in said fourth storage circuit, for the extraction of said corresponding signals representing internal faults;

a fourth testing circuit for comparing said signals representing internal faults extracted from said fourth storage circuit with said signals representing internal faults in said fault lists of said first storage circuit, said testing circuit producing a test signal of a first type for distinguishing each signal representing an internal fault extracted from said fourth storage circuit when a match occurs, said testing circuit producing a test signal of a second type for distinguishing signals representing an internal fault extracted from said fourth storage circuit when no match is found;

a signal transfer circuit to store in said output storage circuit those signals representing internal faults from said fourth testing circuit distinguished by said signal of a second type.

3. An improved digital computer of the type where circuitry is internally connected when a stored list of instructions is processed by a central processing unit, said computer being used for simulating the propagation of internal faults of NOR gates connected for flip-flop operation, wherein the improvement comprises;

1. a first storage circuit for storing the previous error-free output logic values of said flip-flop;

2. a second storage circuit for storing the current error-free input and output logic values of said flip-flop;

3. a third storage circuit for storing signals representing logical equations for the propagation of internal faults of a NOR gate connected flip-flop at the reset output and the set output as functions of previous erron-free output logic values and present error-free input and output logic values;

4. a signal extraction circuit where said error-free output logic values of said first storage circuit and said input and output logic values of said second storage circuit are applied to said third storage circuit for the extraction of said corresponding logical equations.

* * * * *

UNITED STATES PATENT OFFICE
CERTIFICATE OF CORRECTION

Patent No. 3,780,277 Dated December 18, 1973

Inventor(s) Douglas B. Armstrong and Richard G. South

It is certified that error appears in the above-identified patent and that said Letters Patent are hereby corrected as shown below:

Column 1, line 52, change "training" to --taining--.

Column 5, line 48, change "fault" first occurrence to --faulty--.

Column 10, line 8, change "frm" to --from--.

Column 14, line 58, change "erron" to --error--.

Signed and sealed this 23rd day of April 1974.

(SEAL)
Attest:

EDWARD M.FLETCHER,JR.
Attesting Officer

C. MARSHALL DANN
Commissioner of Patents